June 20, 1961 M. MARKS 2,989,677

CONTROL SYSTEMS

Filed March 17, 1959 2 Sheets-Sheet 1

INVENTOR.

Meyer Marks

BY John L. Wiegreffe

ATTORNEY

INVENTOR.
Meyer Marks
BY John L. Nigroffe
ATTORNEY

United States Patent Office 2,989,677

Patented June 20, 1961

2,989,677

CONTROL SYSTEMS

Meyer Marks, Clarendon Hills, Ill., assignor to Admiral Corporation, Chicago, Ill., a corporation of Delaware Filed Mar. 17, 1959, Ser. No. 799,901

10 Claims. (Cl. 318—460)

Figure 1:
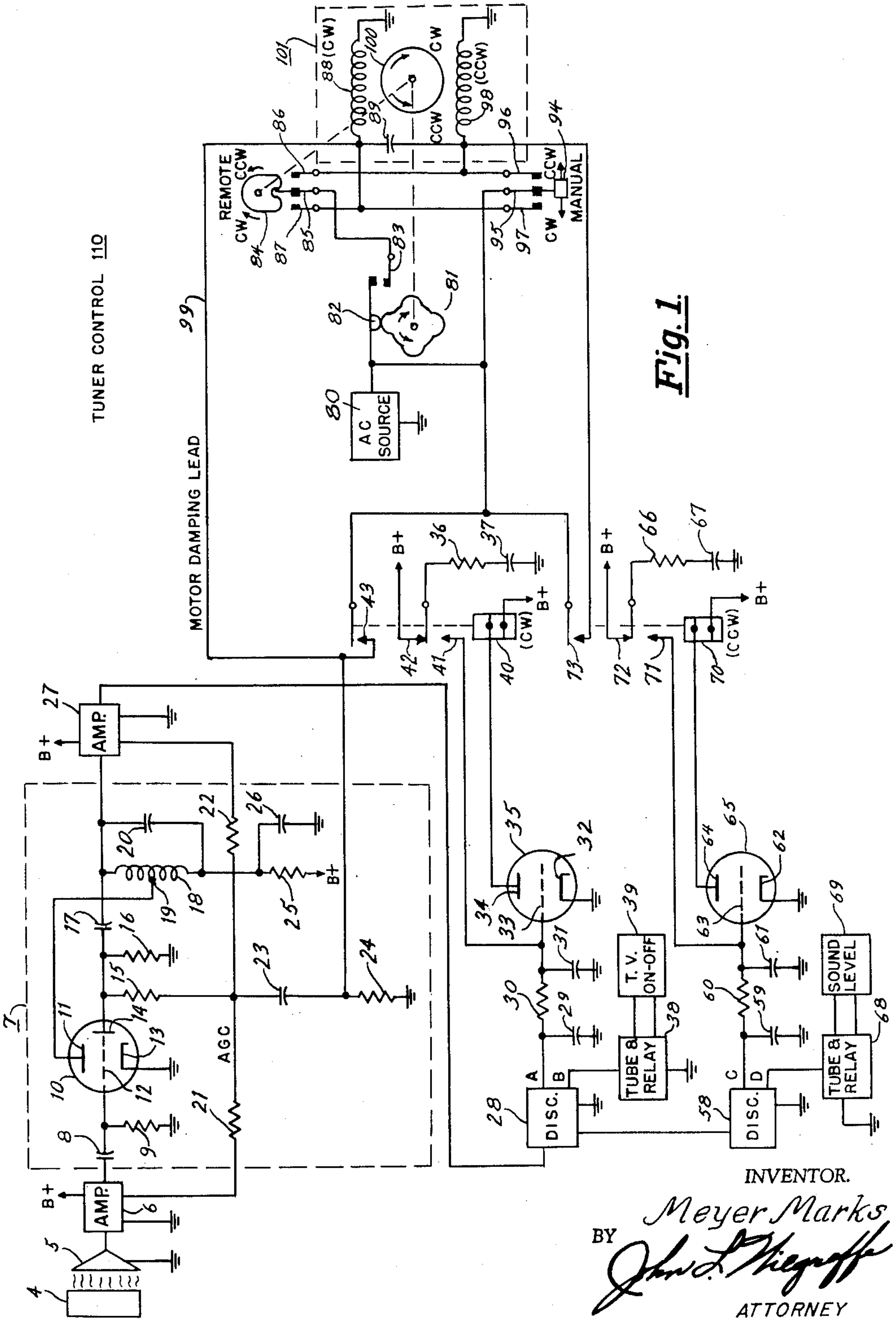

This invention relates in general to control systems and is particularly adapted to control electrical circuits in control systems which are designed to be actuated by wave energy signals and, as particularly shown in the embodiments herein, by ultra-sonic signals. What is described herein is an improved control system for controlling a television receiver. It will be appreciated, however, that the invention need not be confined to the control of a television receiver but may be advantageously used in a variety of control applications.

In one ultra-sonic control system of the prior art, a transmitter, for generating one of four discrete ultra-sonic signals lying within a restricted frequency range, is provided. The signal is picked up by a microphone, amplified, and fed into a limiter tube. Thereafter the signal is fed to a pair of discriminator circuits which determine which of the four signals was transmitted. The outputs of the discriminator circuits are coupled to relay tubes which when rendered conductive operate their associated relays. These relays are connected in the television receiver in a manner to provide channel selection (in either direction) sound muting and television "on and off."

The control circuits of the prior art, in particular the one above mentioned, have various limitations. It has been found that under certain conditions of signal level the channel selector will malfunction, that is, the channel selector can be made to operate more than once in response to a single control signal. This action will, for purposes of convenience, be referred to as channel "overshoot."

To minimize channel "overshoot," the transmitters of the prior art, which in the main comprise a number of resonant bars, with appropriate hammers, housed in a case designed to be held in the hand of the operator, have required some means of mechanical damping. The damping curtails the duration of the signal and hence precludes channel "overshoot" in most cases. The damping feature, however, has added to the complexity and size, and hence to the ease of handling, of the transmitter and additionally has required the use of manual skill on the part of the operator.

In an effort to eliminate channel "overshoot," while at the same time keeping the transmitter small and relatively simple, an automatic motor damping circuit has been incorporated into the control system of the invention, which is superior to any mechanical damping schemes of the prior art.

The control system includes a circuit to insure that the minimum channel selection signal to which the system was designed to respond will actuate the channel selector under a wide range of tuning motor loads. Additionally, through the use of good design technique and a fast acting automatic gain control circuit, the circuit of the invention has obviated the need for the limiter tube which has heretofore been widely used. However, the limiter tube may be advantageously employed in circuits incorporating the invention, in particular with the automatic damping circuitry for the motor.

Accordingly it is a principal object of this invention to provide an ultra-sonic control system which eliminates the damping of the transmitter heretofore found necessary.

A feature of this invention is the incorporation of a fast acting automatic gain control circuit to keep the signal level at the discriminator substantially constant.

Another feature of this invention is the inclusion of an automatic motor damping control for effectively disabling the amplifier as the tuner motor is operated to prevent channel "overshoot" even when a very strong signal is received.

Another feature of this invention directs itself to the novel use of circuitry to insure that a channel selection signal of a predetermined minimum duration will operate the channel selector under a wide range of tuner motor loads.

Figure 2:
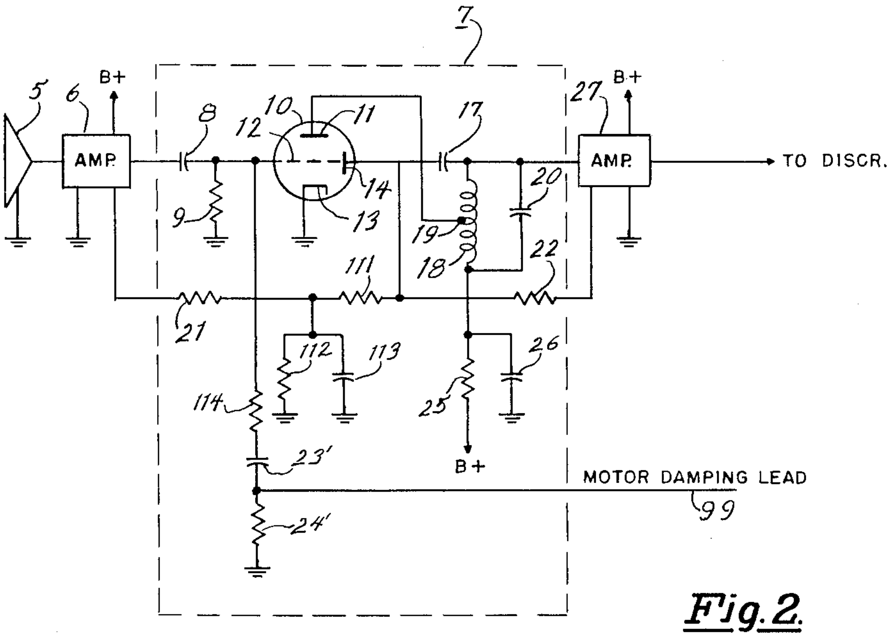
Figure 3:
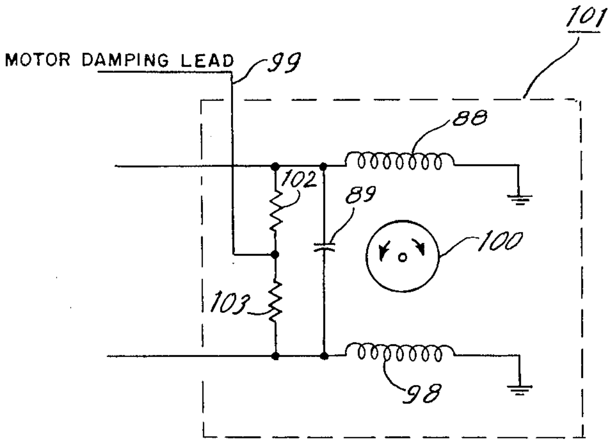

Other objects and features will be apparent upon reading the specification below in conjunction with the drawings in which FIG. 1 represents in partial schematic form a remote control system embodying the above mentioned features and in which FIGS. 2 and 3 represent modification of portions of the circuitry of FIG. 1.

Referring now to FIG. 1, an ultra-sonic transmitter 4, of the type which emits one of four distinct ultra-sonic signals lying within a fixed frequency range, is shown. A microphone 5 receives the ultra-sonic signal and converts it into an electrical signal of the same frequency. The output of microphone 5 is coupled to amplifiers 6, 7, and 27 which are tuned to this fixed frequency range. The output load of amplifier 27 comprises two series connected discriminators 28 and 58 which may be of the conventional type. Each discriminator has two outputs which are separately connected to vacuum tube operated relays to control various functions of a television receiver.

It will be understood that transmitter 4 and microphone 5 are designated as such solely for purposes of illustration. The invention is not dependent upon the use of ultra-sonic signals, but may be used with a variety of transmitters and pickups. The amplifiers 6, 7, and 27 are required in the embodiment shown but it is envisioned that any signal translation means compatible with the transmitter signals could be used.

Looking now at the portion of FIG. 1 following amplifier 27, it is seen that output A of discriminator 28 is connected to an integrating network comprising resistor 30 shunted to ground on either side by capacitors 29 and 31. The junction of resistor 30 and capacitor 31 is connected to control grid 33 of relay tube 35. The cathode 32 of tube 35 is grounded and the plate 34 is connected to a source of positive D.C. potential B+ through relay 40 located in tuner control 110. Thus relay 40 is connected in the output circuit of tube 35 and will operate when tube 35 conducts. For purposes of explanation relay 40 is labeled CW to indicate that it will be operated when the appropriate signal for operating the channel selector in a clockwise direction is transmitted by transmitter 4.

Output C of discriminator 58 is similarly connected through an integrating network, comprising capacitors 59 and 61 and resistor 60, to control grid 63 of relay tube 65 in the output circuit of which relay 70 (CCW) is connected. The remaining outputs B and D of discriminators 28 and 58 are connected to blocks labelled 38 and 68 respectively. These blocks should be understood to contain integrating networks, relay tubes and relays similar to those connected to discriminator outputs A and D. Blocks 38 and 68 are connected to blocks 39 and 69 respectively. As indicated, block 39 incorporates circuitry for turning the television set on and off and block 69 incorporates circuitry for adjusting the television set sound level.

Since this invention is primarily concerned with the tuner control or channel selection function, the tuner control circuitry 110 is shown in detail. It should be realized, however, that the invention is applicable to any control function which is performed by a "programmed" motor and is not to be confined to channel selecting. A bi-directional tuner motor 100 having windings 88 and 98 is mounted on a television set tuner (not shown). Motor windings 88 and 98 are grounded at one end and connected to opposite sides of a capacitor 89 at their other ends. A motor stopping cam 81 for stopping the motor at desired channels is integrally mounted on the motor shaft as is indicated by the dashed line connecting cam 81 and motor 100. A running switch 84 is also mounted on the motor shaft, and is arranged to make a connection between spring 85 and contact 87 when motor 100 starts rotating in a clockwise direction, or between spring 85 and contact 86 when motor 100 rotates in a counterclockwise direction. To provide A.C. power for the bi-directional motor 100, grounded source of alternating current 80 is connected to an off normal switch having a cam follower 82 which rides on the periphery of motor stopping cam 81. Contact 83 of the off normal switch is thus open whenever a lobe of motor stopping cam 81 raises follower 82 and is closed when follower 82 is in the valleys between cam lobes. Off normal contact 83 connects to spring 85 of running switch 84.

In practice motor stopping cam 81 is "programmed" or preset for the particular locality in which the television receiver is to be used, i.e., if the set is to be used in an area receiving channels 2, 5, 7, and 9, a cam having lobes corresponding to these channels will be provided. Alternatively, a circular cam having a number of screws with semi-circular heads mounted along its periphery could be provided, and by a half turn of a screw, a lobe could be established in any desired channel position. Another less desirable method would be to have a cam with a lobe for each channel regardless of whether that channel was being used or not.

The A.C. source is also connected to normally open contacts 43 and 73 of relays 40 and 70 respectively and to spring 95 of manual switch 94. Contact 43 is connected via motor damping lead 99 to the junction of motor winding 88 and capacitor 89. Contact 73 is connected to the junction of motor winding 98 and capacitor 89. Contacts 86 and 87 are connected to contacts 96 and 97 respectively, of manual switch 94. Jumpers are provided between contact 86 and the junction of motor winding 98 and capacitor 89, on the one hand, and between contact 87 and the junction of motor winding 88 and capacitor 89 on the other hand.

For manual operation, manual switch 94 is provided in the event the operator does not wish to use the transmitter. If manual switch 94 is momentarily moved to the left, a circuit through spring 95 and contact 97 will be completed for motor 100. This circuit extends over ground, A.C. source 80, spring 95, contact 97, and motor winding 88. Winding 88 is energized and motor 100 begins to rotate in a clockwise direction. Cam follower 82 drops down as motor stopping cam 81 rotates with motor 100, closing off normal contact 83. Running switch 84 moves clockwise closing contact 87 and completing a parallel path to motor winding 88 from A.C. source 80 through contacts 83 and 87. Thereafter, manual switch 94 may be released and the motor will continue its clockwise rotation until the next succeeding lobe on motor stopping cam 81 opens off normal contact 83 i.e., at the next desired channel. Counterclockwise rotation of the channel selector may be similarly effected by momentarily moving manual switch 94 to the right.

For remote operation, by an ultra-sonic transmitter for example, assume that relay 40 operates in response to an appropriate signal from transmitter 4. Contact 43 closes via the circuitry previously described, and connects A.C. source 80 to motor winding 88. Motor 100 rotates in a clockwise direction. Motor stopping cam 81 closes off normal contact 83 connecting A.C. source 80 to motor winding 88 through contacts 83 and 87 when running switch 84 closes contact 87. Relay 40 restores, after the termination of the signal, opening contact 43. However, as was shown previously, motor 100 continues to operate over the parallel path established through contacts 83 and 87. Again, when the next channel is reached, motor stopping cam 81 opens off normal contact 83 and motor 100 stops. Similar circuitry is shown for operating motor 100 in a counterclockwise direction when relay 70 is operated in response to an appropriate signal from transmitter 4.

Amplifiers 6 and 27, shown in block form, may be conventional amplifiers designed to amplify a restricted range of frequencies within which the signals emanating from transmitter 4 lie. Amplifier 7 is shown in detail within the area enclosed by dashed lines. The output of amplifier 6 is coupled to grid 12 of tube 10 through capacitor 8. Resistor 9 is connected from grid 12 to ground. Cathode 13 of tube 10 is grounded and plate 11 is connected to tap 19 on inductor 18. Inductor 18 together with its shunting capacitor 20 comprise a tuned load for tube 10. A diode plate 14 in tube 10 is connected to the junction of resistors 15 and 16 and capacitor 17. The other terminal of resistor 15 is connected to a lead marked AGC and thence to ground through the series combination of capacitor 23 and resistor 24. The other end of resistor 16 is grounded. The other terminal of capacitor 17 is connected to the upper terminal of the parallel combination of inductor 18 and capacitor 20 through a coupling capacitor (not shown) to amplifier 27. The lower end of the parallel combination of inductor 18 and capacitor 20 is connected to the junction of a resistor 25 and a capacitor 26. The other terminal of resistor 25 is connected to B+ and the other terminal of capacitor 26 is connected to ground. The lead marked AGC extends to the left through resistor 21 to amplifier 6 and to the right through resistor 21 to amplifier 27.

In operation a signal is received from transmitter 4, picked up by microphone 5, converted to an electrical signal of the same frequency and coupled to amplifier 6 where it is amplified. Amplifier 6 may include as many stages of amplification as necessary. The amplified signal in the output of amplifier 6 is coupled via capacitor 8 to grid 12 of tube 10 in amplifier 7 in a conventional manner. The signal is further amplified by tube 10 and appears across its tuned output load consisting of inductor 18 and capacitor 20. Capacitor 26 bypasses the signal to ground. The amplified signal is then impressed via the coupling capacitor (not shown) in amplifier 7, to amplifier 27 where it is again amplified in a well known manner.

A portion of the output signal of tube 10 is taken from the tuned circuit, comprising inductor 18 and capacitor 20, through capacitor 17 and thence through the parallel combination of resistor 16, and resistor 15, capacitor 23 and resistor 24, to ground. This fed back signal from the tuned circuit of tube 10, is impressed on diode element 14. Diode element 14 and cathode 13 rectify this portion of the signal and a negative potential is developed between diode element 14 and ground. The negative voltage appearing across capacitor 23 and resistor 24 is put on the AGC lead. Since the magnitude of this negative potential varies directly with the output signal strength of tube 10, automatic gain control of amplifiers 6 and 27 is realized by impressing this voltage through resistors 21 and 22, on the respective grids (not shown) of these amplifiers.

The automatic gain control threshold may be set so that the weakest signal to which the control system is designed to respond will be fully amplified; whereas stronger signals will be amplified inversely to the signal level. Thus the output signal of amplifier 27 may be held relatively constant throughout a considerable range of signal levels transmitted by transmitter 4.

As mentioned previously the series connected discriminators 28 and 58 make up the output load of amplifier 27. Discriminator 28, for example, is tuned to a frequency lying midway between the two lower frequencies transmitted by transmitter 4. Similarly discriminator 58 is tuned to a frequency midway between the two higher frequencies of transmitter 4. This arrangement is well known in the art and therefore will not be explained further. In absence of a signal, the outputs A, B, C and D of the discriminators are held negative by circuitry (not shown) in the discriminators. Output A of discriminator 28 will swing positive in response to receipt by microphone 5 of the lowest frequency of transmitter 4. Output B will swing positive when the second lowest frequency is transmitted. Similarly output C of discriminator 58 will swing positive when the second highest frequency of transmitter 4 is transmitted and output D will go positive responsive to the highest frequency of transmitter 4. Thus discriminators 28 and 58 effectively determine which of the four signal frequencies has been transmitted by transmitter 4.

Assume that output A of discriminator 28 is driven positive as a result of a clockwise channel selection signal from transmitter 4. The integrating circuit comprising capacitors 29 and 31 and resistor 30 will now time the duration of the signal since the output from amplifier 27, is, due to the automatic gain control previously described, held relatively constant. It is apparent that, through proper choice of components in the integrating network, relay tube 35 may be held non-conductive until output A has been positive for a predetermined length of time. This length of time is set in accordance with the weakest signal (and hence shortest in duration also since the signals are inherently damped) to which the amplifier is to respond. Thus extraneous signals and noises lying within the restricted frequency range will not actuate tube 35, since they will not generally by of sufficient duration at any one frequency. If the signal received is of the proper duration and amplitude the capacitors of the integrating network will charge and place a positive bias on grid 33 of tube 35. Tube 35 will conduct and relay 40, which is connected in its output circuit, will operate. The channel selecting function is then carried out as previously described.

The level and duration of the signal from transmitter 4 may vary depending on the distance of the transmitter from the microphone and the force with which the tuning rods are struck. Frequently a channel selection signal of high amplitude and long duration is picked up by microphone 5 with the result that output A of discriminator 28 (or output C of discriminator 58) is held at a positive potential for a relatively long time period. Thus tube 35 may conduct, and consequently hold relay 40 operated, for a length of time greater than that required for motor 100 to rotate the television tuner switch (not illustrated) to the next channel for which stopping cam 81 is set. Motor 100 will not be stopped by the opening of off normal contact 83 since a parallel path to motor winding 88 still exists through contact 43 of relay 40. In this case, channel "overshoot" occurs and, depending upon the duration of the transmitted signal, one or more channel selections may be made in response to a single signal.

To overcome this, a motor damping lead 99 is connected to the junction of resistor 24 and capacitor 23 in the automatic gain control circuit. When relay 40 operates, the A.C. source voltage 80 is impressed across resistor 24 to ground. This A.C. voltage is coupled through capacitor 23 and resistor 15 to diode element 14 of tube 10 where it is rectified. Hence a strong negative potential is placed on the AGC lead which cuts off amplifiers 6 and 27. Also it will be noted that capacitor 23 develops a negative potential on its grid side and upon removal of the damping voltage will continue to hold the amplifier disabled for a fixed period of time. Thus the control amplifier as a whole is disabled during receipt of a relatively strong signal from transmitter 4, and for a short time after the next programmed channel has been selected, obviating the possibility of channel "overshoot" in the event of a strong control signal.

If output C is driven positive responsive to an appropriate signal from transmitter 4, the integrating network comprising capacitors 59 and 61 and resistor 60 operates in the same manner as the integrating network previously described above to drive relay tube 65 conductive. Relay 70 which is connected in the output circuit of tube 65 operates and, at its contact 75, connects A.C. source 80 to motor winding 98 of motor 100. Motor 100 operates in a counter clockwise direction and motor stopping cam 81 and running cam 84 operate as before, but in the reverse direction. By motor action, an out of phase voltage is induced in motor winding 88 when motor winding 98 is energized. This induced voltage is fed back over damping lead 99 to the automatic gain control circuit and cuts off amplifier 6 and 27 as in the case when relay 40 operates. Thus motor damping action is attained regardless of whether motor 100 is driven in a clockwise or counter clockwise direction.

The output level of amplifier 27 and the circuit constants of the integrating networks determine the minimum signal to which the remote control system will respond. In practice it has been found that such variables as tuner friction, relay adjustment, and differences in vacuum tube characteristics often resulted in the control system not responding to the minimum signal for which it was designed. Often, when a minimum signal is received, relay 40 or relay 70, as the case may be, releases before motor 100 has rotated sufficiently to allow motor stopping cam 81 to close contacts 83 and/or running cam 84 to close contacts 86 or 87. Thus, before the parallel path to motor 100 is established, the original operating path is broken and tuner control circuit 110 in effect does not respond to the signal sent by transmitter 4. To obviate this difficulty, another set of contacts have been provided (contacts 41—42 and 71—72) on each of relays 40 and 70.

Again referring to relay 40, normally closed break contact 42 connects a source of positive potential B+ to the serially connected combination of resistor 36 and capacitor 37, thus charging capacitor 37. When make contact 41 closes upon operation of relay 40, the previously mentioned combination of resistor 36 and capacitor 37 is shunted across grid 33 and cathode 32 of relay tube 35. Therefore, when tube 35 conducts responsive to a signal from transmitter 4, relay 40 operates and, in so doing, connects via contact 41 a previously charged capacitor 37 to grid 33 of tube 35 to hold this tube conductive for a sufficient time to insure that the parallel operating path to motor 100 will be completed. Similar circuitry is provided for relay tube 65 and the operation is identical.

FIG. 2 shows a modification of the circuitry for disabling the amplifier when motor 100 is operated. Amplifier 7 in FIG. 2 is substantially the same as amplifier 7 in FIG. 1 as is evidenced by the like reference characters used. In FIG. 2, automatic gain control voltage is developed across resistor 111 and the parallel grounded combination of resistor 112 and capacitor 113. Again diode element 14 of tube 10, in conjunction with cathode 13, serves as the automatic gain control rectifier which develops a bias voltage proportional to the magnitude of the output signal of tube 10. Motor damping lead 99 is connected to the junction of capacitor 23′ and resistor 24′. The other terminal of capacitor 23′ is connected through a resistor 114, to grid 12 of tube 10. Thus the motor damping voltage is applied to the grid of tube 10 rather than being tied into the automatic gain control circuit as was done in FIG. 1.

Since grid 12 is physically very close to cathode 13, these elements act as a rectifier. During negative portions of the A.C. voltage on lead 99, tube 10 is biased beyond cut off due to the large negative voltage appearing on grid 12. During positive portions of the A.C. voltage, grid 12 draws current. In practice, resistor 114 is in the order of a megohm whereas the effective impedance between grid 12 and cathode 13 when the grid is drawing current, is around one thousand ohms. Hence substantially all of the A.C. voltage is impressed across the combination of resistor 114 and capacitor 23′, and very little amplification occurs in tube 10. Additionally, since the impedance of the grid circuit is extremely low, the gain of the preceding amplifier 6 is decreased considerably. The net effect is that the amplifier sections of the control system are substantially disabled while A.C. voltage from source 80 is on lead 99.

After a few cycles of A.C. on lead 99, capacitor 23′ is substantially fully charged with its grid side having a negative polarity. When the voltage on lead 99 is removed (off normal contact 83 opened by motor stopping cam 81) capacitor 23′ begins to discharge through resistors 24′, 114 and 9. Consequently the amplifier is disabled not only during operation of motor 100, but for a fixed period of time after motor 100 has stopped thus preventing successive operation of motor 100 upon receipt of a strong signal from transmitter 4.

In FIG. 3 there is shown another method of connecting motor damping lead 99 to the motor windings. FIG. 3 is the same as the area 101 enclosed by the dashed lines in FIG. 1 except for the addition of resistors 102 and 103 serially connected across capacitor 89, and the connection of motor damping lead 99 to the junction of these resistors. Although no actual difficulty was encountered with the portion of the circuit of FIG. 1 indicated by enclosed area 101, the voltages obtained on motor damping lead 99 varied depending upon whether motor 100 was energized to run clockwise or counter clockwise. In fact, when counter clockwise motor winding 98 was energized, the out of phase voltage appearing across winding 88 was greater in magnitude than that which appeared when winding 88 itself was energized. Since the disabled time of the amplifier is a function of the final voltage on capacitor 23 in FIG. 1 and capacitor 23′ in FIG. 2, which is a function of the voltage on motor damping lead 99, the disabled time of the amplifier differed for clockwise and counter clockwise rotation. The circuit of FIG. 3 was developed to insure that this difference in disabled time would have no adverse effects on the system performance.

In the circuit of FIG. 3 the voltage appearing on motor damping lead 99 will be constant regardless of whether the motor is energized to run in a clockwise direction or counter clockwise direction since resistors 102 and 103 act as an equalizing bridge. Taking the motor damping lead voltage from the junction of these two resistors obviates the effect of reversal of motor direction on the motor damping lead voltage.

Thus it may be understood that this invention contemplates an improved control system which is actuated by wave energy signals, an embodiment of which illustrates the use of ultra-sonic signals. Therefore it is desired that this invention be limited only by the scope of the appended claims.

What is claimed is:

1. In combination in a control system responsive to a signal having predetermined characteristics; signal translation means; utilization means; discriminating means having an input circuit coupled to said translation means and an output circuit coupled to said utilization means; means in said output circuit for energizing said utilization means in response to a signal having said predetermined characteristics; and disabling means for disabling said translation means upon energization of said utilization means.

2. In combination in a control system responsive to a signal having predetermined characteristics; signal translation means; utilization means; discriminating means having an input circuit coupled to said translation means and an output circuit coupled to said utilization means; means in said output circuit for energizing said utilization means in response to a signal having said predetermined characteristics; disabling means for disabling said translation means upon energization of said utilization means; and sustaining means, responsive to energization of said utilization means, for sustaining said utilization means in an energized condition for a predetermined period of time.

3. In combination in a control system selectively responsive to signals having predetermined common characteristics and predetermined individual characteristics; signal translation means; a plurality of utilization devices; discriminating means having an input circuit coupled to said translation means and a plurality of output circuits individually coupled to corresponding ones of said plurality of utilization devices, said discriminating means selectively energizing said output circuits in accordance with said predetermined individual characteristics of said signals; said output circuits including means responsive to said predetermined common characteristics of said signals for energizing said utilization devices coupled therewith; and disabling means responsive to energization of certain of said utilization devices for disabling said signal translation means.

4. In combination in a control system selectively responsive to signals having predetermined common characteristics and predetermined individual characteristics; signal translation means; a plurality of utilization devices; discriminating means having an input circuit coupled to said translation means and a plurality of output circuits individually coupled to corresponding ones of said plurality of utilization devices, said discriminating means selectively energizing said output circuits in accordance with said predetermined individual characteristics of said signals; said output circuits including means responsive to said predetermined common characteristics of said signals for energizing said utilization devices coupled therewith; and sustaining means, responsive to energization of certain of said utilization devices for sustaining said utilization devices in an energized condition for a predetermined period of time.

5. In combination in a control system selectively responsive to signals having predetermined common characteristics and predetermined individual characteristics; signal translation means; a plurality of utilization devices; discriminating means having an input circuit coupled to said translation means and a plurality of output circuits individually coupled to corresponding ones of said plurality of utilization devices, said discriminating means selectively energizing said output circuits in accordance with said predetermined individual characteristics of said signals; said output circuits including means responsive to said predetermined common characteristics of said signals for energizing said utilization devices coupled therewith; disabling means for disabling said signal translation means upon energization of certain of said utilization devices; and sustaining means, responsive to energization of said certain utilization devices, for sustaining said certain utilization devices in an energized condition for a predetermined period of time.

6. In combination in a control system responsive to a signal having predetermined characteristics; a driving means; a driven means having a plurality of preselected positions, coupled to said driving means; signal translation means; actuating means interposed between said translation means and said driving means for actuating said driving means responsive to a signal having said predetermined characteristics, said driven means driven from one of said preselected positions to an adjacent position; and disabling means for disabling said translation means upon actuation of said driving means.

7. A control system selectively responsive to a group of signals having a predetermined minimum amplitude and duration comprising; amplifying means for receiving and amplifying said signals; a plurality of utilization devices; frequency discriminating means having an input circuit coupled to said amplifying means and a plurality of output circuits individually coupled to corresponding ones of said utilization devices; said output circuits including means for determining the minimum duration of said signals; said amplifying means including automatic gain control means for reducing the gain of said amplifying means in response to signals having an amplitude in excess of said predetermined minimum amplitude to maintain the signal level at said input circuit substantially constant, said frequency discriminating means energizing a different one of said output circuits for each signal in said group having said predetermined minimum amplitude and duration and means for disabling said amplifying means upon operation of certain ones of said utilization devices.

8. In combination in a control system responsive to a signal having predetermined characteristics; a motor; programming means coupled to said motor for controlling the operation thereof; signal translation means; motor operating means interposed between said translation means and said motor for energizing said motor responsive to a signal having said predetermined characteristics; disabling means included in said motor operating means for disabling said translation means upon energization of said motor, said programming means effective to simultaneously control said motor operation and maintain said translation means in its disabled condition; and delay means in said translation means, energized during the disabled time of said translation means, for holding said translation means disabled for a predetermined period of time after said motor operation ceases.

9. In combination in a control system responsive to an ultra sonic signal of predetermined frequency and having a predetermined minimum amplitude and duration, receiving means for receiving, amplifying and detecting said signal, a motor and a source of power therefor, an electron valve, a relay in the load circuit of said valve, said relay being energized upon conduction in said valve and connecting said source of power to said motor, means including a discriminator and an integrating network interposed between said receiver means and said valve for driving said valve conductive only in response to a signal having said predetermined frequency and said predetermined minimum amplitude and duration, a driven element mechanically coupled to said motor, a programming switch mechanically coupled to said driven element and including means for deenergizing said motor at preselected positions of said driven element, a disabling circuit included in said receiver means, said relay upon energization also convecting said source of power to said disabling circuit, whereby said receiver means is rendered insensitive to all signals during substantially all of the time required for said driven element to be driven from any of said preselected positions to an adjacent preselected position.

10. In the combination as set forth in claim 9 wherein said motor and said power source are of the alternating current type and wherein said disabling circuit includes a rectifying junction for rectification of said alternating current.

References Cited in the file of this patent

UNITED STATES PATENTS

| | | |
|---|---|---|
| 2,805,379 | Troeller et al. | Sept. 3, 1957 |
| 2,897,354 | Bourget et al. | July 28, 1959 |